United States Patent [19]
Stephens

[11] Patent Number: 5,645,375
[45] Date of Patent: Jul. 8, 1997

[54] METHOD AND APPARATUS FOR GROUTING OF TUNNEL LINERS

[76] Inventor: Patrick J. Stephens, 1276 Chuckanut Dr., Bellingham, Wash. 98225

[21] Appl. No.: 472,115

[22] Filed: Jun. 7, 1995

[51] Int. Cl.$^6$ .................................................. F16L 55/18
[52] U.S. Cl. ........................... 405/146; 138/98; 405/154
[58] Field of Search .................................. 405/147, 146, 405/150.1; 166/293; 52/742.63; 138/97, 98; 156/287, 294; 264/269

[56] References Cited

U.S. PATENT DOCUMENTS

| | | | |
|---|---|---|---|
| 3,561,223 | 2/1971 | Tabor | 405/147 X |
| 4,063,425 | 12/1977 | Jutte et al. | 405/147 X |
| 4,419,135 | 12/1983 | Hoge | 106/678 |
| 4,786,206 | 11/1988 | Yamomoto et al. | 405/150.1 X |
| 4,984,933 | 1/1991 | Annett et al. | 405/146 X |
| 5,063,967 | 11/1991 | Stephens | 138/98 |

OTHER PUBLICATIONS

Halliburton Services, Industrial Grouting Technical Data, Injector G Silicate Grouting Service.

Soast, Allen, "Mix halts flowing water in seconds," ENR Feature, Jul. 20, 1989.

*Primary Examiner*—Dennis L. Taylor
*Attorney, Agent, or Firm*—Todd N. Hathaway

[57] ABSTRACT

A method and apparatus for filling cavities in underground excavations. Sodium silicate and aqueous foam are mixed with cement slurry to produce a quick-setting foamed cement grout having a meringue-like consistency. The high viscosity of the grout combines with the very fast initial set time to minimize the problem of grout flowing out of the cavity following injection. The method and apparatus are particularly suited to grouting of the annular cavity which is formed between the tail shield of a tunnel boring machine and a segmental tunnel liner which is assembled therein.

8 Claims, 7 Drawing Sheets

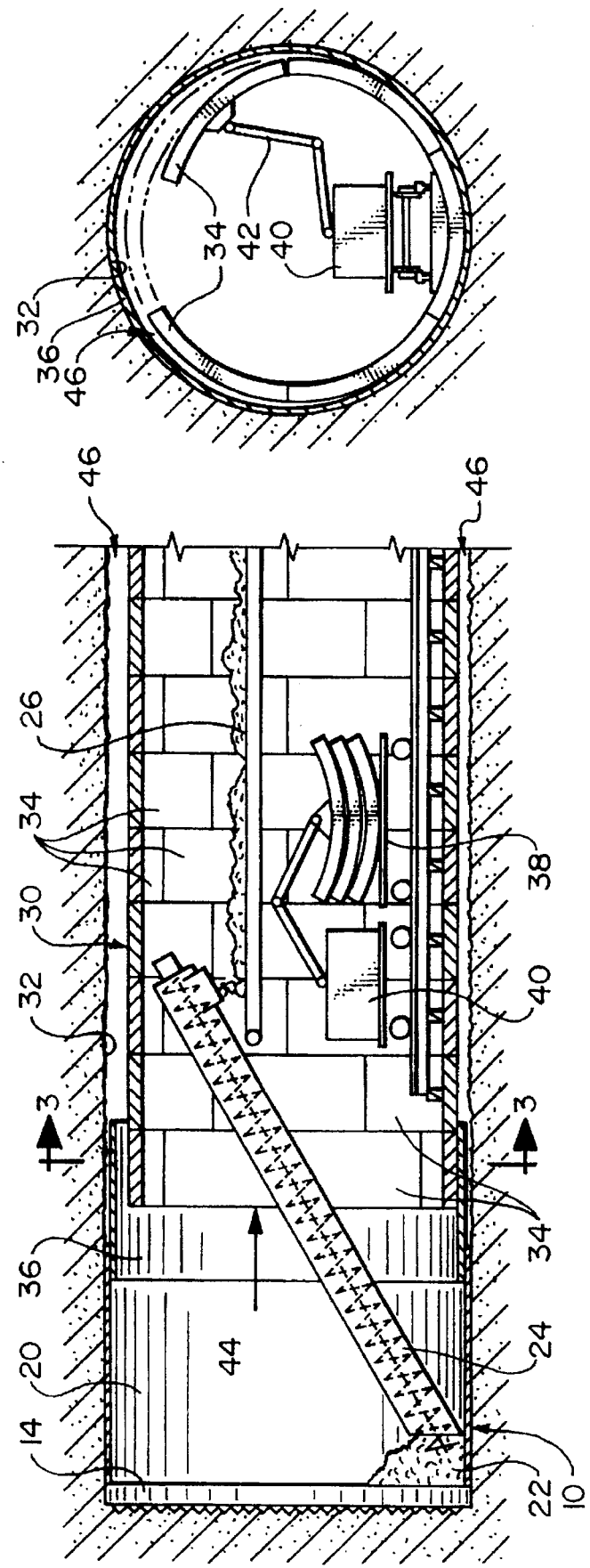

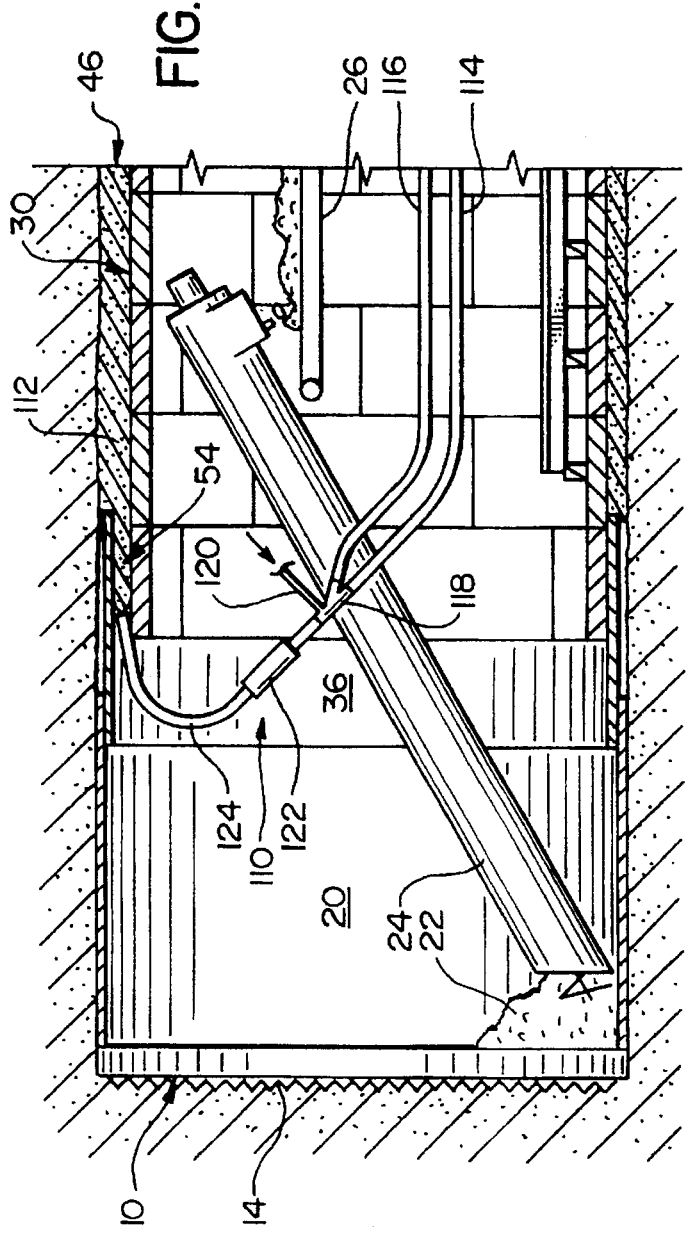
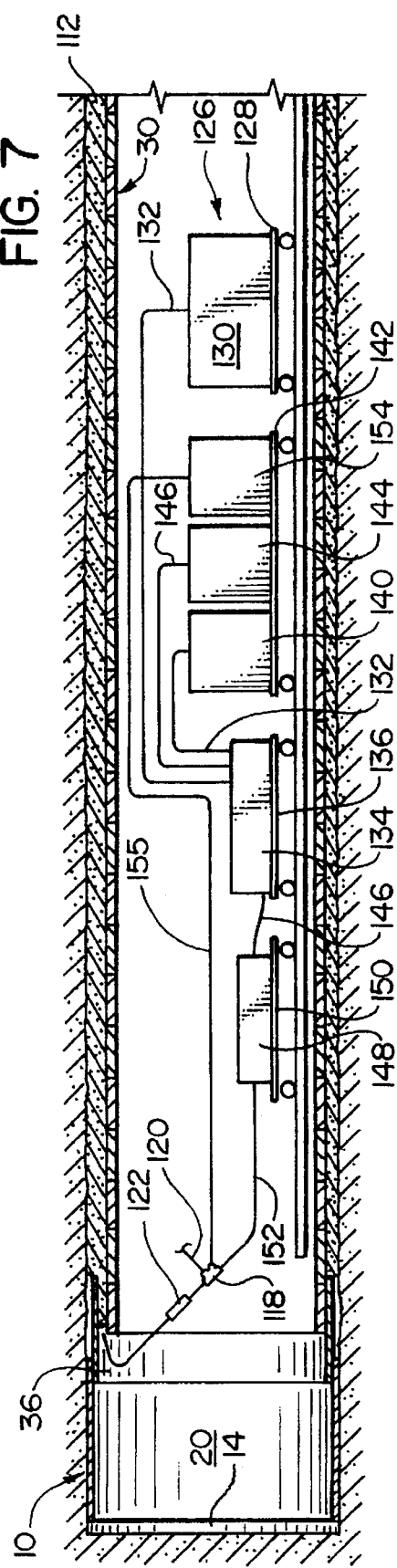
FIG. 6
FIG. 7

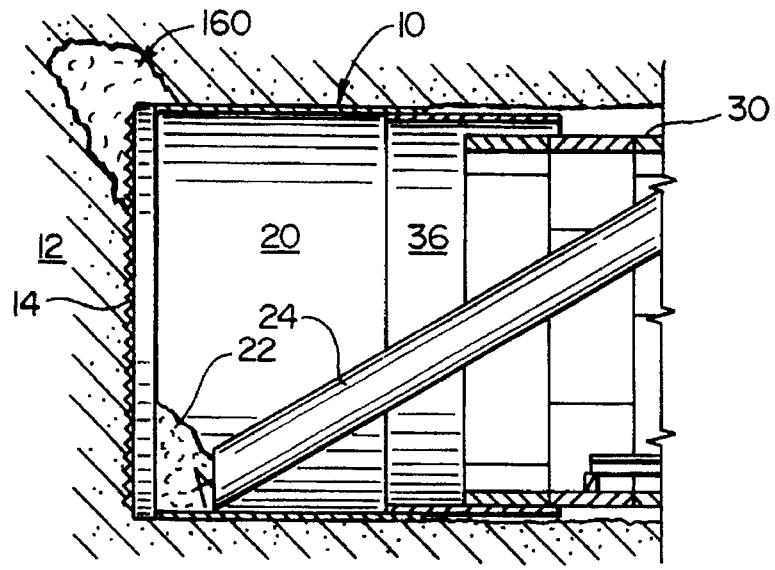
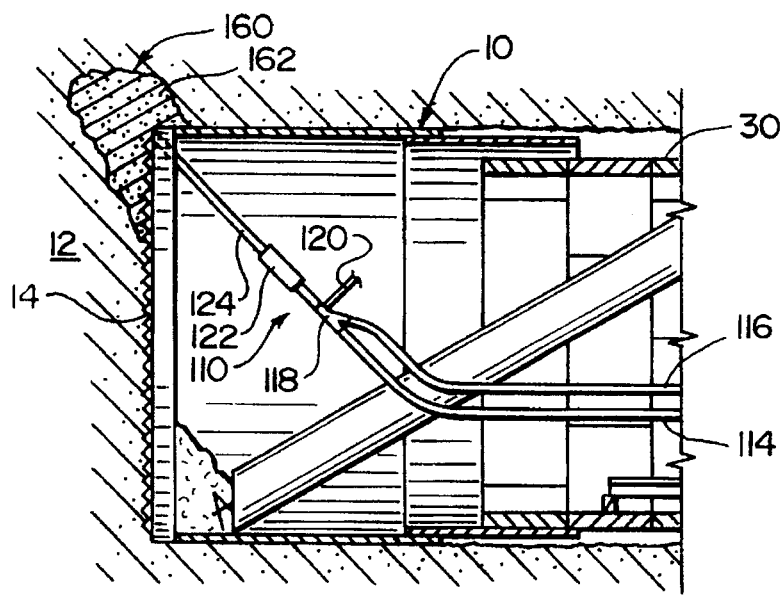
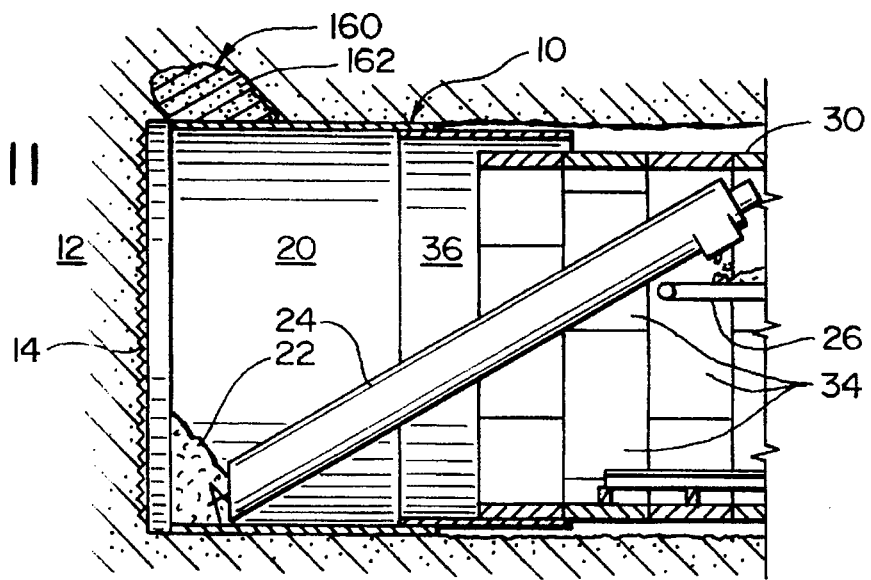

METHOD AND APPARATUS FOR GROUTING OF TUNNEL LINERS

BACKGROUND OF THE INVENTION

1. Field of the Invention

The present invention relates generally to excavation work and subterranean tunneling, and more particularly to a method and apparatus for cementitious grouting of the annular cavity between a tunnel bore and the segmented liner which is installed behind a tunnel boring machine.

2. Background

In modern construction, large diameter tunnels are commonly excavated by means of a tunnel boring machine (TBM).

The tunnel boring machine is not itself a part of the present invention, but its basic components and operation will be described here to give the reader a better understanding of the invention. An exemplary TBM 10 is shown in FIG. 1, as this is engaged in boring through a subterranean formation 12. A large rotating cutter head 14 having a series of cutter teeth 16 on its forward face is located at the forward end of the TBM. The machinery for rotating the cutter head and the associated controls (not shown) are housed within a cylindrical steel shield 20. Rubble 22 (see FIG. 2) which is removed from the rock face by the cutter head is picked up and transported by screw lift 24, from which the material is discharged onto a belt conveyer 26 for removal through the excavated bore.

A tunnel liner 30 is normally installed in the tunnel bore 32 behind the TBM. In most large diameter excavations the liner is of the segmental type, as is shown in FIGS. 1 and 2, wherein the liner is formed of a series of arcuate segments 34 which are assembled inside the telescoping tail shield 36 of the TBM. Typically, the liner segments 34 are transported to the installation site on rail cars 38, and are assembled by means of a traveling hoist 40. The latter is provided with an arm mechanism 42 by which the liner segments 34 are placed to form a circular segment of the cylindrical liner, the segments 34 typically being held in place by bolts, interlocking lugs, or other features.

The tunnel liner 30, in addition to providing a containment/support structure and preventing the collapse of material into the interior of the tunnel, provides a reaction point against which the TBM 10 "pushes off" to effect its forward motion; hydraulic jack mechanisms (not shown) mounted within the TBM thrust against the forwardmost liner segments, in the directions indicated by arrows 44, as the machine works its way through the subterranean formation. After the machine has moved forward to a certain point, the jacks and telescoping tail shield 36 are withdrawn forwardly to permit the installation of another ring of liner segments.

Because the TBM "pushes off" from the ring of liner segments, it is essential that the annular gap 46 exterior to the segments be filled with a supporting material, lest the segments buckle outwardly and become displaced in response to the compressive forces which are exerted against the forward edge of the ring. As is illustrated in FIGS. 4 and 5, this has been done in the prior art by filling the annular gap with gravel 48 or other unconsolidated material. Typically, this is done by bringing a gravel cart (not shown) into the tunnel and then blowing the gravel into the annular cavity using compressed air, as through the hose 50 which is shown in FIG. 4. This approach, however, has exhibited numerous deficiencies in practice. Firstly, blowing the gravel into place is a very slow and labor-intensive operation; the operator personnel must move the hose 50 around to place the gravel, and the material is difficult to work with. As a result, the gravel car must remain in place for an extended period, blocking the forward end of the tracks and preventing the delivery of additional liner segments. This, in turn, prevents forward progress of the TBM during this period; because the hourly cost of operating the TBM and its supporting systems is exceedingly high, these delays add greatly to the total cost of the tunneling operation.

Another problem with using gravel or other loose or unconsolidating material to fill the annulus 48 is that this tends to cascade or spill down on the sides of the liner segments leaving unfilled gaps at the cown of the liner and spilling into the interior of the TBM shield, as indicated at area 52 in FIG. 4, from which it must be removed or else it may impair the operation of the machine. Moreover, in order to complete the installation, it is necessary to follow the placement of the gravel by the injection or "squeezing" of cement grout through ports 53 in the liner segments, adding to the overall cost of the operation.

Some attempts have been made to use conventional cement grouts to fill the annulus, in place of gravel. These attempts have proven wholly unsuccessful, because the fluid grout is simply too "runny" and flows down along the liner and spills out into the interior of the shield, in a manner similar to the gravel shown in FIG. 4 but only worse. Moreover, if a conventional cement grout begins to set up in the gap 54 between the liner and the tail shield 36, the material will stick to the liner and shield, making it impossible to retract the latter. The gravel avoids this problem because of its unconsolidated nature, but at the cost of the other problems described above.

Polyurethane foam grouts are quick setting and therefore might eliminate some of the problems noted above. However, the toxic fumes, high flammability and high exothermic temperatures which are associated with polyurethane grouts present unacceptable safety hazards in a closed, subterranean environment.

Accordingly, there exists a need for a method and apparatus for filling the annular cavity between a tunnel liner and the tunnel bore which is expeditious and does not require excessive manpower to accomplish. Moreover, there is a need for such a method and apparatus which obviates the problem of the fill material spilling into the interior of the tunnel boring machine and leaving gaps at the crown of the liner. Still further, there is a need for such a method and apparatus which utilizes a fill material which is both economical and acceptable from a safety standpoint.

SUMMARY OF THE INVENTION

The present invention has solved the problems cited above. Broadly, this is a method for filling a cavity in an excavation. The method comprising the steps of: (a) providing a cement slurry solution; (b) mixing a sodium silicate solution with the cement slurry solution in an amount sufficient to accelerate hardening of the resulting cementitious mixture to a predetermined initial set time; (c) mixing aqueous foam with the cementitious mixture in an amount sufficient to increase viscosity of a resulting foamed cement grout sufficiently to minimize flow of the grout out of the void prior to the initial set time; and (d) flowing the grout into the cavity so that the cavity is filled thereby.

The step of mixing the sodium silicate solution with the cement slurry solution may comprise the step of combining the sodium silicate solution with the cement slurry solution in a mixing nozzle assembly which is located proximate the cavity, so as to minimize the time required to flow the grout into the cavity.

Also, the step of mixing the aqueous foam with the cementitious mixture may comprise the step of combining the aqueous foam with the cementitious mixture in the mixing nozzle assembly. The step of combining the aqueous foam with the cementitious mixture in the nozzle assembly may comprise the steps of: (a) mixing aqueous foam solution with the cementitious mixture; (b) supplying compressed air to the nozzle assembly; and (c) mixing the air with the cementitious mixture and foam solution in the nozzle assembly so as to form the foamed cement grout having the increased viscosity.

The step of supplying the compressed air to the nozzle assembly may comprise the step of supplying the compressed air to the mixing nozzle assembly so that the air forces the cementitious mixture and the foam solution through a static mixture in which the air is mixed therewith so as to form the foamed cement grout.

The cavity which is filled by the grout may be an annular gap which is formed between a tail shield of a tunnel boring machine and a segmental tunnel liner which is assembled in the interior thereof. In this case, the step of filling the cavity may comprise the step of flowing the foamed cement grout into the annular gap so that upon setting the grout supports the segmental tunnel liner against outward buckling in response to forces which are exerted longitudinally on a liner by the tunnel boring machine. Also, the step of mixing the foam with the cementitious mixture may comprise the step of mixing the aqueous foam with the cementitious mixture in an amount sufficient to increase viscosity of the resulting foam cement grout efficiently to minimize flow of the grout downwardly along the sides of the tunnel liner and outwardly into the interior of the tunnel boring machine. Furthermore, the aqueous foam may be mixed with the cementitious mixture in an amount which is sufficient to reduce the shear strength of the foamed cement grout upon settling to a shear strength which allows the tail shield of the tunnel boring machine to free itself therefrom upon forward retraction of the shield.

BRIEF DESCRIPTION OF THE DRAWINGS

FIG. 2 is a side view of a longitudinal cross-section of the tunnel boring machine and tunnel liner of FIG. 1, showing the removable excavated rubble and the delivery of the segmental liner members;

FIG. 3 is a transverse cross-section taken along the line 3—3 in FIG. 2, showing the inplacement of the tunnel liner segments;

FIG. 6 is a view similar to FIG. 4, showing the filling of the annular space between the tunnel liner and bore with a quick-setting foamed cement grout in accordance with the present invention;

FIG. 7 is a longitudinal cross-section of the tunnel of FIG. 6, showing diagramatically the systems for delivery and injection of the quick setting foamed cement grout as shown in FIG. 6;

FIG. 9 is a cross-sectional view similar to FIG. 6, showing a void or area of poorly consolidated rock or earth which is penetrated by the TBM and which may present a cave-in problem;

FIG. 10 is a view similar to FIG. 9, showing the manner in which the injection nozzle for the quick-setting foamed cement grout of the present invention is directed to fill the void or area of poorly consolidated material;

FIG. 11 is a view similar to FIGS. 9–10, showing the subsequent advance of the TBM past the void or area of previously unstable material which has been filled by the quick-setting foamed cement grout in accordance with the present invention.

DETAILED DESCRIPTION a. Overview

Figure 1:
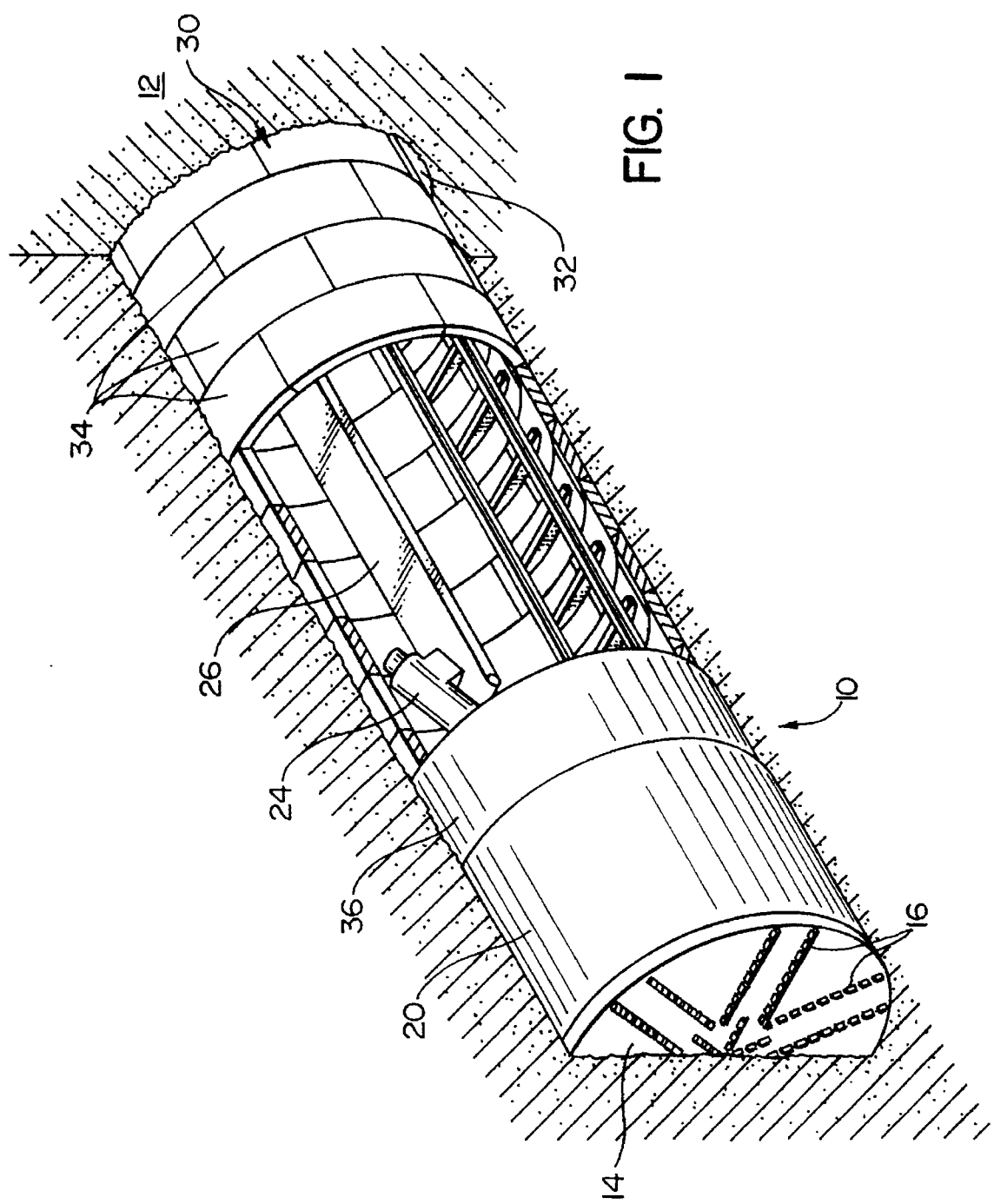
FIG. 1 is a perspective view of a tunnel boring machine advancing through a subterranean formation, with the tunnel bore which is formed thereby being lined with segmental tunnel liners.
Figure 4:
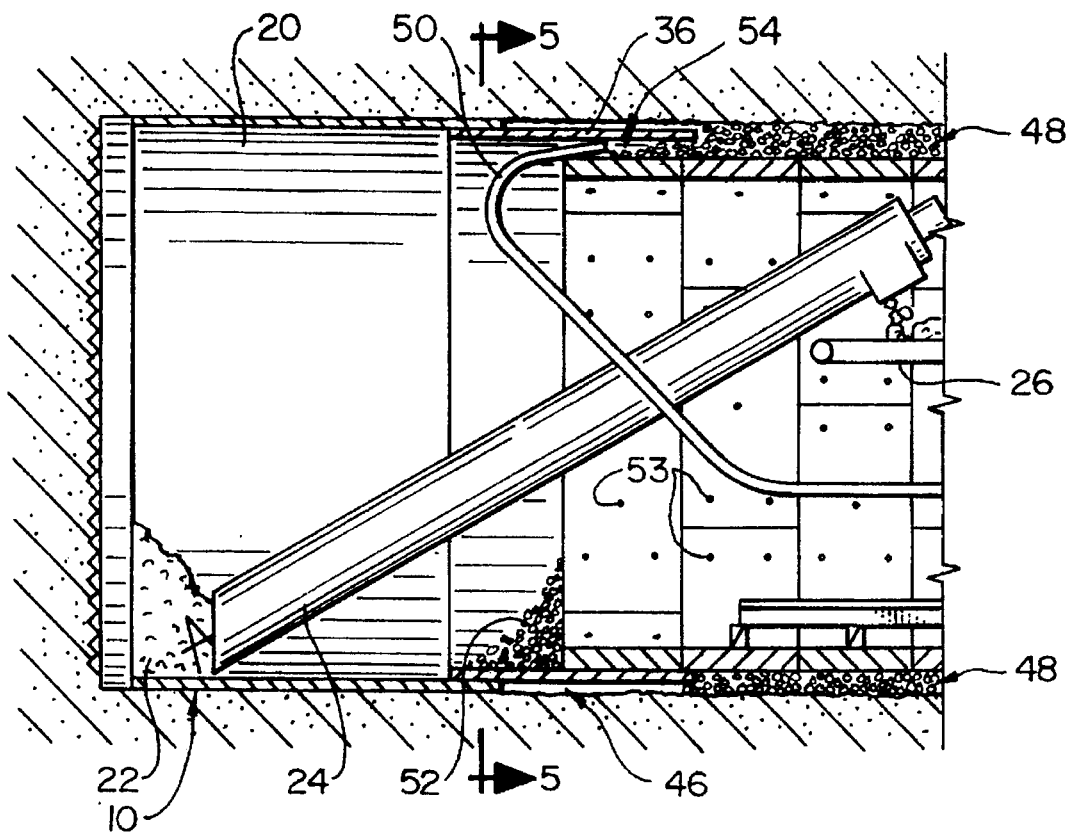
FIG. 4 is a view similar to FIG. 2, showing the filling of the annular space between the tunnel liner and bore with gravel in accordance with prior art techniques.
Figure 5:
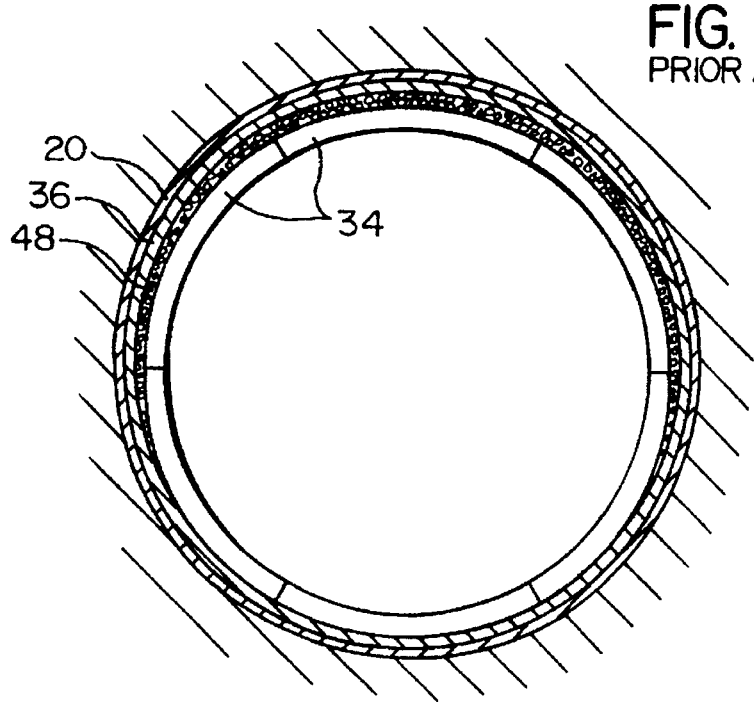
FIG. 5 is a cross-sectional view taken along line 5—5 of FIG. 4.

As was noted above, the present invention has solved the problems of the prior art, by the use of a quick-setting foamed cement grout to fill the annular cavity intermediate the tunnel liner and bore following a tunnel boring machine. Accordingly, FIG. 6 (in which like numerals refer to like elements relative to FIGS. 1–5 which have been discussed above), shows an injection assembly 110 which generates the quick-setting foamed cement grout 112 and injects this into the annulus 46 in accordance with the present invention. As can be seen in FIG. 6, the assembly 110 comprises several lines which carry the components of the grout to a mixer. Specifically, there is a cement slurry hose 114 and a sodium silicate hose 116 which meet at a "Y" 118 at which the two components of the slurry are combined. Pressurized air is injected via line 120 proximate the outlet end of the "Y", so that the resultant mixture—cement slurry, sodium silicate and air—is forced through a downline static mixer 122. The resulting mixture, which is essentially a cellular foamed cement grout having a greatly accelerated setting rate due to the sodium silicate component, flows through a relatively short injection hose 124 and is directed into the annular cavity 46 between the segmental tunnel liner 30 and the tail shield 36. As will be described in greater detail below, the combination of the relatively high viscosity (as compared with ordinary cement grouts) of the foamed cement grout with the accelerated setting rate obviates the problem of the material flowing downwardly down the sides of the liner and into the interior of the tunnel boring machine before hardening.

Although the sodium silicate component causes the foamed cement grout to set up very rapidly (e.g., 3–50 seconds) within the annular cavity, the cellular structure of the resulting solidified material provides it with a relatively low shear strength which allows the steel surface of the tail shield 36 to readily free itself therefrom. Thus, even after the material sets up, the tail shield easily pulls free from the solidified mass and is retracted forwardly for the next phase of excavation and liner installation.

Because the quick-setting foamed cement grout is easily and quickly effected by pumping through the injection hose, the procedure is greatly expedited relative to the use of gravel. Moreover, because all of the components (e.g., cement slurry/foam solution, sodium silicate, and air) are fluid in nature, these may be mixed and delivered to the injection cite through conduits which are routed along the side or overhead of the tunnel and out of the way of the segmental liner delivery and installation trucks, so that operation of the TBM and construction of the tunnel can be conducted without significant interruption.

b. Equipment

The equipment and systems which are preferably employed to produce and inject the quick-setting foamed cement grout of the present invention are shown diagramatically in FIG. 7. In the embodiment which is shown therein, the equipment is carried upon the rail cars; it will be understood, however, that in some embodiments the components of the quick-setting cellular concrete grout (i.e., cement slurry/foam solution, sodium silicate, and air) may be pumped to the mixing device from the portal or other remote location without the use of rail cars or similar transportation vehicles.

As was noted above, the components which are provided to the static mixer 122 are (i) cement slurry, (ii) aqueous foam solution, (iii) sodium silicate in a predetermined amount, and (iv) pressurized air. The embodiment which is illustrated in FIG. 7 provides a self-contained, transportable assembly 126 for supplying each of these components. Accordingly, a first car 128 in the assembly carries a supply of cement dust in a hopper 130 or similar container. The cement dust is fed via line 132 to a mixer 134, such as a paddle type mixer, which is carried on a second car 136. The water for the cement slurry, in turn, is supplied through line 138 from a water tank 140 on car 142. The water and cement dust are combined in the mixer 134 to form the cement slurry, and foam concentrate from tank 144 is added to the slurry through line 146.

The resulting cement slurry/foam concentrate mixture is fed from mixer 134 through line 146 to a pump 148 which is carried on car 150. The pump 148, which may be a moyno-type or piston-type slurry pump, for example, discharges the cement slurry/foamed concentrate mixture under pressure through line 152 to the "Y" fitting 118.

The sodium silicate solution is supplied from tank 154 to the second inlet of the "Y" fitting 118 via line 155. Both the cement slurry/foam concentrate mixture and the sodium silicate solution are relatively fluid and can be pumped over long distances if desired, even from a remote location further down or outside the tunnel bore in some embodiments. However, once the two components are combined at the Y fitting, the mixture begins to set up at a highly accelerated rate, with solidification occurring within a few seconds to a few minutes. Accordingly the "Y" fitting is positioned closely adjacent to the injection hose 124 so as to minimize flow time to the injection site.

Pressurized air from a compressor (not shown) or other source is injected into the discharge end of the "Y" fitting through line 120. This pressurizes the flow, and increases its velocity as it passes through the static mixer 122. As a result, the three components—i.e., the cement slurry/foam concentrate mixture, the sodium silicate solution, and the air—are combined in the static mixer to form a foamed cement grout having a meringue-like consistency. This passes through the injection hose 124 at an accelerated flow rate, and is discharged into the gap 54 external to the assembled segments of the liner 30, inside of the tail shield 36.

Because of its meringue-like consistency, the foamed cement grout which has been injected into the annular cavity tends to remain in place, minimizing or eliminating any possibility of the material flowing downwardly along the sides of the liner segments. Depending on the sodium silicate proportion, solidification occurs within a few seconds following injection, minimizing or eliminating any possibility of the material escaping from the annulus into the interior of the TBM.

As a result, the present invention enables the annular gap around the tunnel liner to be filled at a greatly accelerated rate, as compared with the use of gravel. Also, the material is easy to work with, minimizing the labor required.

Because of its comparatively low shear strength, the steel tail shield 36 easily frees itself from the solidified mass when this is retracted forwardly; in some embodiments, this may be facilitated by use of a permanent or applied low adhesion coating on the interior of the tail shield, or through inclusion of a lubricating agent in the grout mixture itself. However, the hardened foamed cement grout exhibits relatively high compressive strength, so that this provides a very solid fill material which holds the liner segments in place against longitudinal forces as the TBM "pushes off".

The hardened foamed cement grout yields a cellular structure, i.e., the foam bubbles produce a multiplicity of voids in the solidified mass. This reduces the amount of cement which is required to fill the annulus, and thereby reduces total cost. Also, because the hardened grout fills the annulus with a solid mass, as opposed to the unconsolidated gravel, the need for follow-on grouting is minimized; additional grout may be placed through the injection holes (see FIG. 4) using conventional techniques, if needed, but the amount of grout and time required is greatly reduced as compared to the follow-on grouting of gravel fill.

Figure 8:
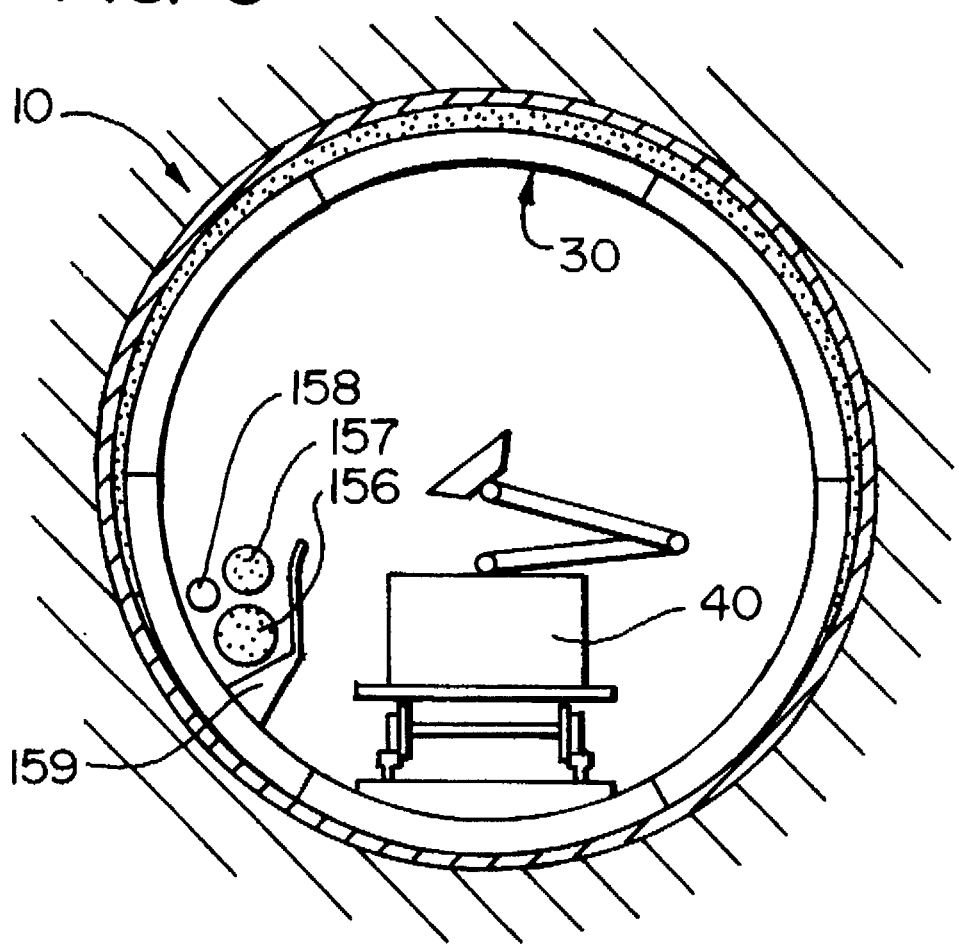
FIG. 8 is a transverse cross-sectional view showing an embodiment of the present invention in which the components for the quick setting foamed cement grout are supplied from a remote site via pipes or other conduits, as opposed to the rail cars shown in FIG. 7.

As was noted above, in some embodiments of the present invention the fluid components of the quick setting foamed cement grout may be supplied to the mixing and injection assembly through hoses or pipes from a remote location, possibly outside of the tunnel bore. Accordingly, FIG. 8 shows the conduits through which these materials may be supplied in such an embodiment, specifically a cement slurry/foam solution line 156, sodium silicate solution line 157, and compressed air line 158. A series of brackets 159 are provided to hold the conduits along the sidewall of the tunnel liner 30. This keeps the tunnel bore and tracks clear for the conveyance of equipment and materials, permitting the unimpeded continuation of the tunneling operations while the grouting is being conducted.

c. Spot-Fill/Stabilization

It is not uncommon to encounter voids/fissures or areas of relatively unstable earth as the tunneling progresses through otherwise relatively solid rock. If these areas are not stabilized prior to being excavated by the cutter head 14, the earth will tend to collapse into the path of the TBM, requiring removal of excessive material; moreover, structural problems with the formation or collapse may develop in some situations.

The present invention provides an efficient and economical solution to this problem. As can be seen in FIGS. 8–10, when a void or area of relatively unconsolidated earth material 160 is encountered in the path of the tunnel boring machine, the injection hose 124 of assembly 110 is directed into this area through one or more of the openings in the cutter head, as is shown in FIG. 9. The grout 162 penetrates into the unstable area and quickly solidifies so as to provide a stable region adjacent the TBM through which the machine can then proceed, as shown in FIG. 10, without excessive material collapsing into the cutter head.

d. Grout Composition

As was noted above, the quick setting foamed cement grout which is used in the present invention is a cementitious mixture of a Portland cement slurry, aqueous foam concentrate, and water soluble sodium silicate solution.

The base material for the grout mix is the Portland cement, and any conventional Portland cement material may be used for this purpose.

The aqueous foam solution is mixed with this in a suitable amount to provide a stable bubble structure upon mixing with air. Suitable foam concentrate solutions, which are essentially foam-forming surfactants, are available from the Mearl Corporation (Roselle Park, N.J.) as "MEARLCEL FOAM LIQUID" and from Elastizell Corporation (Ann Arbor, Mich.) as "ELASTIZELL EF" mix ratios for the foam solution, are available from the manufacturers, and concentrations of about 2–5% by volume are generally satisfactory.

The aqueous sodium silicate solution, in turn, serves to control the rate at which the mixture hardens or sets up. Suitable sodium silicate materials are available from the PQ Corporation, Valley Forge, Pennsylvania. Sodium silicate solutions are commonly employed for ground stabilization, by drilling into the ground and pumping the sodium silicate solution into the bores or otherwise mixing this with the soil column. Also, sodium silicate additives have been used to form fast setting cement grouts for blocking rushing water, for example, through leaks in dams. It should also be noted that, although sodium silicate is generally preferred due to its economy and wide availability, other suitable soluble silicate additives may occur to those skilled in the art.

By adjusting the ratio of the cement slurry to the sodium silicate, the initial set time can be adjusted over a relatively wide range, e.g., 3–50 seconds. For example, a typical ratio of cement slurry to sodium silicate solution which provides effective performance is about 1:1 by volume; in other words, one gallon of cement slurry per gallon of sodium silicate solution. Slower setting times can be achieved by reducing the ratio of the cement to the sodium silicate, and faster times can be achieved by increasing this ratio; for example, a cement slurry to sodium silicate ratio of ½:1 has provides a relatively slower setting time, while ratios in the range of 1½–3:1 provide relatively faster set times. Suitable ratios may be found within the range from about 1:1 to 10:1. For example, an eminently suitable mix is 450 gallons of cement to 80 gallons of sodium silicate, providing a ratio of about 5.6:1.

An exemplary mix design which provides satisfactory performance is set forth in the following table:

TABLE I

| Cement Solution - | 250 lbs. Type I Portland cement |
| --- | --- |
| | 50 lbs. fly ash |
| | 21 gal. water |
| | 5% aqueous foam concentrate |
| Sodium Silicate - | 1 part by volume sodium silicate |
| Solution | 1 part by volume water |
| Quick-Set Grout - | 28 gal. cement solution |
| | 9 gal. sodium silicate solution |

This example provides a cement slurry to sodium silicate solution ratio of approximately 3:1. Also, as can be seen from the table, the mix may contain materials or additives in addition to the Portland cement and sodium silicate, such as fly ash, for example.

Figure 12:
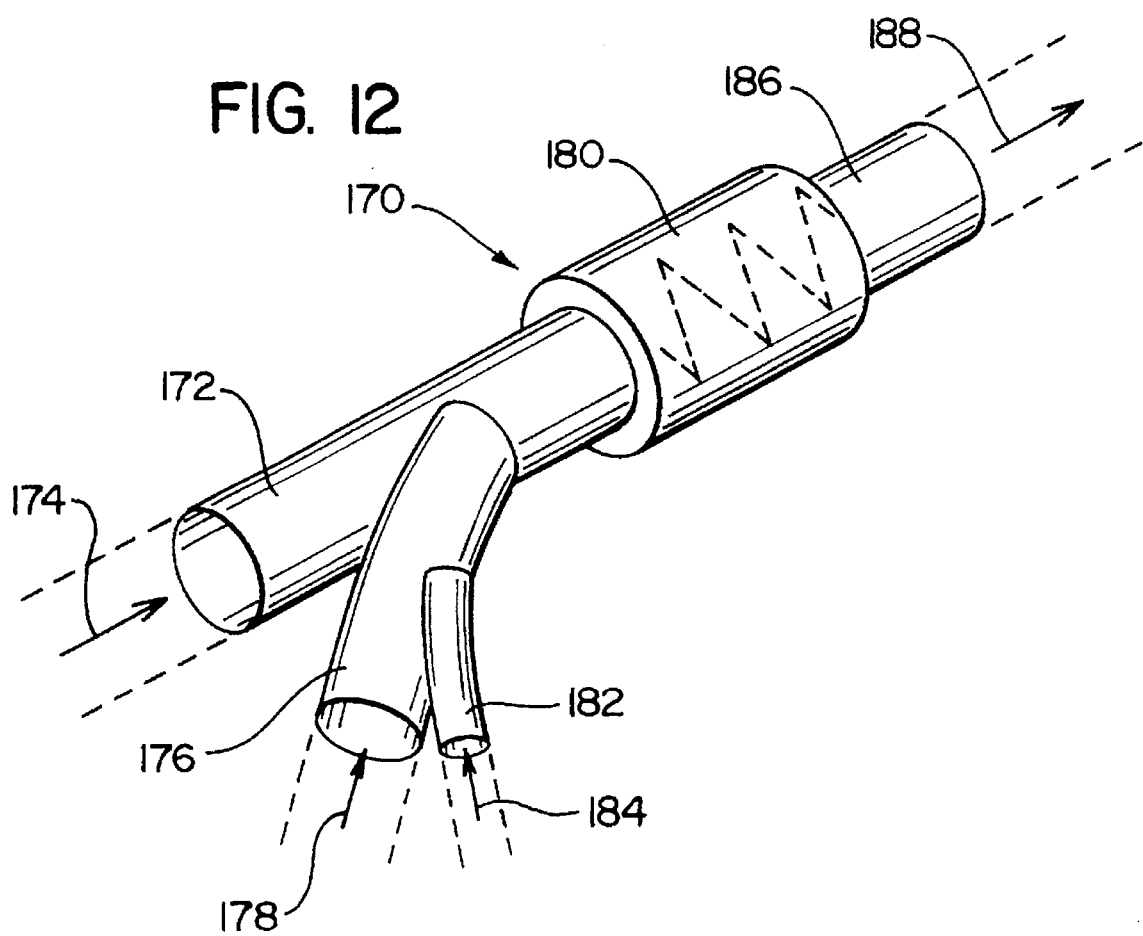
FIG. 12 is a perspective view of a nozzle assembly for mixing the components of the quick-setting foamed grout, just prior to the grout being discharged into the injection site.

Because of the extremely rapid set time of this composition, the final mixing (of the cement slurry and sodium silicate solution) must take place only shortly before discharge into the injection site. An exemplary mixing nozzle 170 for this purpose is shown in FIG. 12; this is generally similar to a combination of the fitting and static mixture which have been discussed above. The cement slurry/aqueous foam solution mixture is pumped into the nozzle assembly through the primary entry tube 172, in the direction indicated by arrow 174. The sodium silicate solution, in turn, is supplied through a secondary entry tube 176, in the direction indicated by arrow 178. The secondary entry tube 176 forms a "Y" with the primary entry tube 172, and discharges into the latter so that the flow is directed toward the static mixer 180. An air injection line 182 is also attached to the secondary entry tube, and compressed air is supplied through this in the direction indicated by arrow 184. The compressed air serves the dual purpose of accelerating the flow through the static mixer and providing the gaseous component for formation of the bubble structure of the resulting foamed grout. Accordingly, as the mixture which is formed in the primary entry tube 172—cement slurry, aqueous foam solution, sodium silicate, and compressed air—passes through the static mixer 180 at a relatively high rate of flow, these are combined and agitated to produce the foamed grout having a relatively meringue-like consistency. This exits the nozzle assembly 170 through discharge tube 186 and an attached injection hose, in the direction indicated by arrow 188. The maximum acceptable length of the injection hose may vary according to the set time of the mixture being used, and for very fast setting mixes, a length of about 20 inches is suitable.

Having provided a description of the invention in its preferred embodiments, it will be obvious to those of ordinary skill in the art that improvements, additions, deletions, or changes may be made thereto which are intended to fall within the scope of the present invention. For example, in some embodiments it may be preferred to add the cellular component as finished foam (i.e., foam solution which has already been combined with air to form the bubble structure), rather than mixing the liquid foam solution with the other liquid components and then mixing in the air; in such embodiments, it may be possible to dispense with the compressed air supply line and static mixer or other components. Furthermore, it may be that, depending on the compressive strength desired, it may be preferred to use the quick-setting grout with a greatly reduced or possibly eliminated foam component. Still further, although the present invention has been described herein with reference to the preferred systems which permit more or less continuous mixing and injection of the quick-setting foamed cement grout, it may be preferred in some embodiments to use a smaller scale, albeit less efficient, batch type approach in which small batches of the grout are prepared and/or injected piecemeal. Accordingly, the present invention is not to be limited except as by the appended claims.

What is claimed is:

1. A method for filling a cavity in an excavation, said method comprising the steps of:

providing a cement slurry solution;

mixing a sodium silicate solution with said cement slurry solution in an amount sufficient to accelerate hardening of a resulting cementitious mixture to a predetermined initial set time;

mixing aqueous foam with said cementitious mixture so as to entrain air therein and thereby form a viscous, low shear-strength foamed cement grout, said aqueous foam being added to said cementitious mixture in an amount sufficient to provide said foamed cement grout with a viscosity which is sufficiently high to minimize flow of said grout through and out of said void prior to said initial set time; and flowing said grout into said cavity so that said cavity is filled thereby.

2. The method of claim 1, wherein the step of mixing said sodium silicate solution with said cement slurry solution comprises the step of:

combining said sodium silicate solution with said cement slurry solution in a mixing nozzle assembly which is located proximate said cavity so as to minimize the time required to flow said grout into said cavity.

3. The method of claim 2, wherein the step of mixing said aqueous foam with said cementitious mixture comprises the step of:

combining said aqueous foam with said cementitious mixture in said mixing nozzle assembly.

4. The method of claim 3, wherein the step of combining said aqueous foam with said cementitious mixture in said nozzle assembly comprises the steps of:

mixing aqueous foam solution with said cementitious mixture;

supplying compressed air to said nozzle assembly; and mixing said air with said cementitious mixture and foam solution in said nozzle assembly so as to form said foamed cement grout having said increased viscosity.

5. The method of claim 4, wherein the step of supplying said compressed air to said nozzle assembly comprises the step of:

supplying said compressed air to said mixing nozzle assembly so that said air forces said cementitious mixture and foam solution through a static mixer in which said air is mixed therewith so as to form said foamed cement grout.

6. The method of claim 1, wherein said cavity is an annular gap formed between a tail shield of a tunnel boring machine and a segmented tunnel liner which is assembled interior to said shield, and wherein the step of filling said cavity comprises the step of:

flowing said foamed cement grout into said annular gap so that upon setting said grout supports said segmented tunnel liner against outward buckling in response to forces exerted longitudinally on said liner by said tunnel boring machine.

7. The method of claim 6, wherein the step of mixing said foam with said cementitious mixture comprises the step of:

mixing said aqueous foam with said cementitious mixture in an amount sufficient to increase viscosity of said resulting foamed cement grout sufficiently to minimize flow of said grout downwardly along sides of said tunnel liner and outwardly into an interior of said tunnel boring machine.

8. The method of claim 7, wherein the step of mixing said foam with said cementitious mixture further comprises the step of:

mixing said aqueous foam with said cementitious mixture in an amount sufficient to reduce a shear strength of said foamed cement grout upon setting to a shear strength which allows said tail shield to free itself therefrom upon forward retraction of said shield.

* * * * *